Aug. 7, 1956    M. VLOCK    2,757,471
HORIZONTAL AND VERTICAL MOUNTINGS FOR X-RAY FILMS
Filed Feb. 11, 1953    2 Sheets-Sheet 2

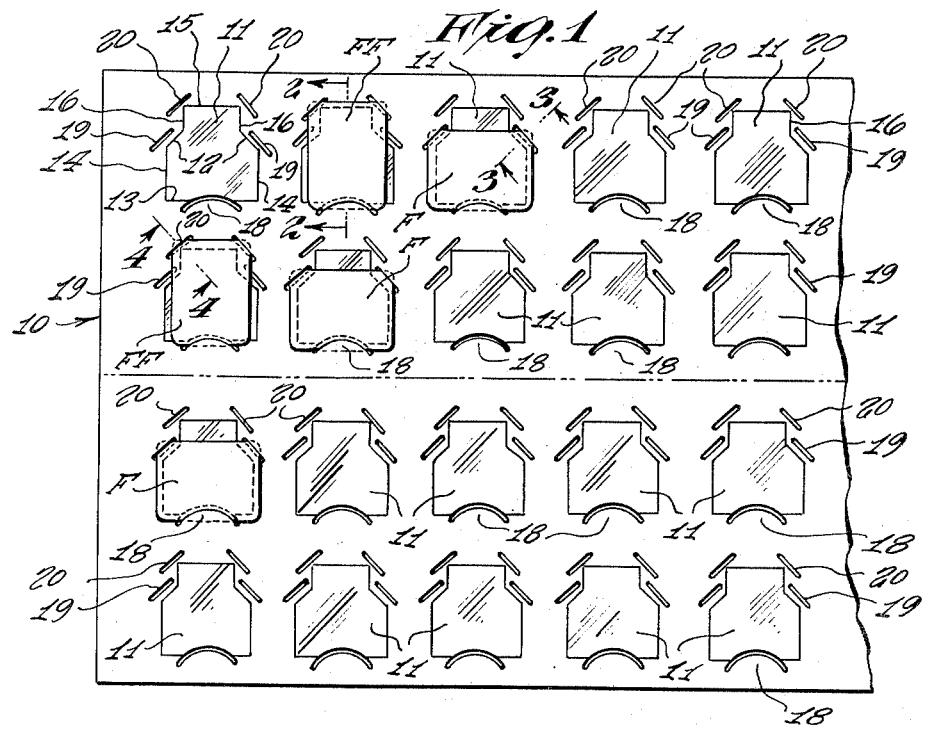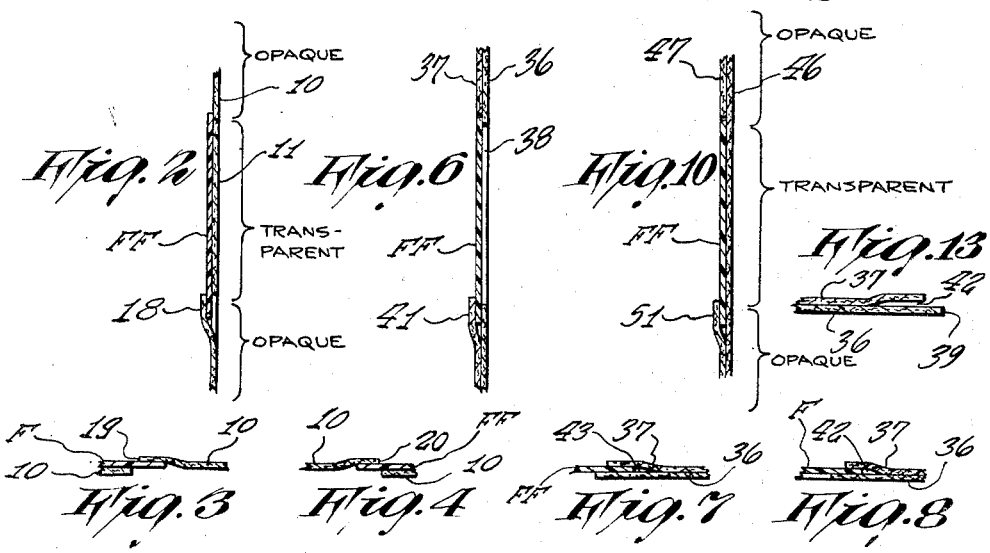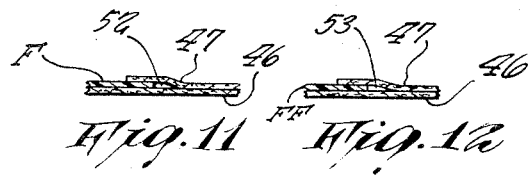

INVENTOR.
MARK VLOCK
BY Clark & Ott
ATTORNEYS

United States Patent Office 2,757,471
Patented Aug. 7, 1956

2,757,471

HORIZONTAL AND VERTICAL MOUNTINGS FOR X-RAY FILMS

Mark Vlock, Bronx, N. Y.

Application February 11, 1953, Serial No. 336,333

1 Claim. (Cl. 40—158)

This invention relates to a mount for X-ray films or radiographs.

The invention has in view a mount for X-ray films or radiographs of the type employed by physicians or dentists for showing the condition of the teeth and which are retained in position therein for viewing the same by means of a light.

An object of the invention is to provide a mount of said character in which the required number of X-ray films or radiographs may be arranged for any one patient and any one of the X-ray films or radiographs may be disposed with the length thereof arranged either horizontally or vertically.

Heretofore it has been the practice to employ separate mounts arranged for receiving X-ray films or radiographs with the length thereof disposed horizontally or vertically respectively, that is, one of the mounts is arranged for receiving X-ray films with the length disposed horizontally and another mount is arranged for receiving X-ray films with the length thereof disposed vertically. In some instances, mounts have been employed in which portions are arranged for receiving the films with the length thereof disposed horizontally and other portions arranged for receiving the films with the length thereof disposed vertically. This has required a great many different types of mounts to meet the individual preference of the physician or dentist for taking X-ray films or radiographs of the teeth with the length of the teeth arranged either horizontally or vertically. An object of the present invention therefore, is to provide a mount in which any number of X-ray films or radiographs may be mounted for any one patient and in which any one of the films may be disposed either horizontally or vertically.

Another object of the invention is to provide a mount of said character in which the lower edges of the X-ray films or radiographs are on the same horizontal line whether the films are mounted horizontally or vertically.

With the foregoing and other objects in view, reference is now made to the following specification and accompanying drawings in which the preferred embodiments of the invention are illustrated.

In the drawings:

Fig. 1 is a face view of a mount embodying the invention for holding a plurality of X-ray films or radiographs required for any one patient, arranged either horizontally or vertically.

Fig. 2 is an enlarged fragmentary sectional view taken approximately on line 2—2 of Fig. 1.

Fig. 3 is an enlarged fragmentary sectional view taken approximately on line 3—3 of Fig. 1.

Fig. 4 is a similar view taken approximately on line 4—4 of Fig. 1.

Fig. 6 is an enlarged fragmentary sectional view taken approximately on line 6—6 of Fig. 5.

Fig. 7 is a similar view taken approximately on line 7—7 of Fig. 5.

Fig. 8 is an enlarged fragmentary sectional view taken approximately on line 8—8 of Fig. 5.

Fig. 10 is an enlarged fragmentary sectional view taken approximately on line 10—10 of Fig. 9.

Fig. 11 is an enlarged fragmentary sectional view taken approximately on line 11—11 of Fig. 9.

Fig. 12 is a similar view taken approximately on line 12—12 of Fig. 9.

Fig. 13 is a similar view taken approximately on line 13—13 of Fig. 5.

Figure 5:
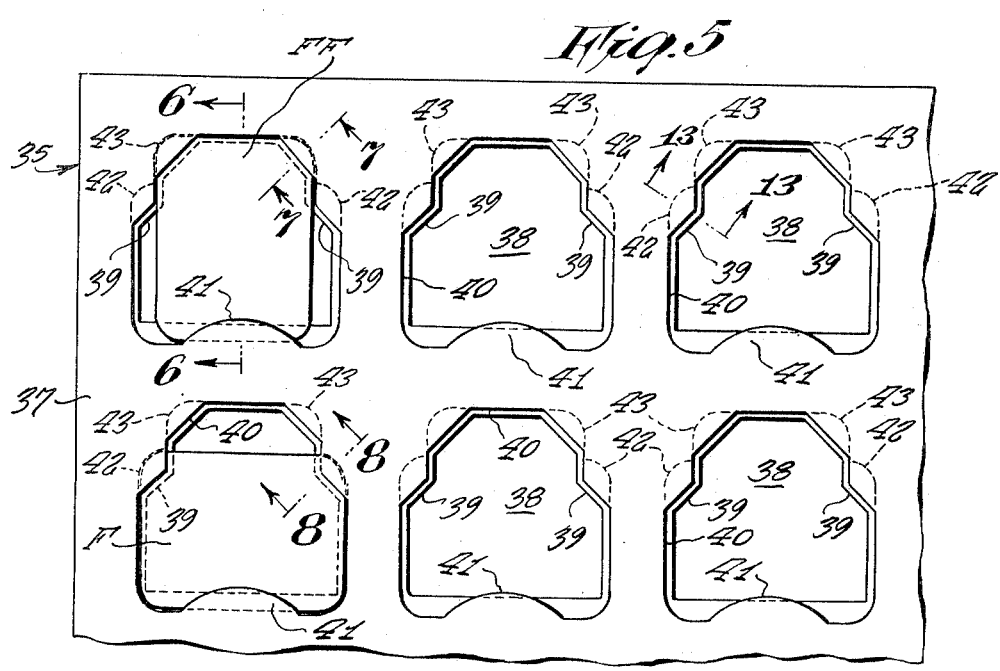
Fig. 5 is a fragmentary plan view of a mount for holding a plurality of X-ray films or radiographs, embodying a modified form of the invention.

The invention is illustrated in its application to a mount for receiving any number of X-ray films or radiographs of the teeth which may be desired for any one patient, and the mount may be provided with indicia for indicating the particular picture taken of the teeth, such as upper posterior, lower posterior, upper anterior, lower anterior, and interproximal.

Referring to the drawings by characters of reference, and more particularly to the form of the invention illustrated in Figs. 1 to 4 inclusive thereof, the mount includes a panel 10 having means for receiving any desired number of X-ray films or radiographs of the teeth for any one patient. The aforesaid means is arranged so that any one of the X-ray films or radiographs may be disposed with the length thereof arranged either horizontally or vertically and preferably the arrangement is such that the bottom edges of the films in any row are disposed on a parallel line crossing the strip from one side to the other. For this purpose the panel 10 is provided with a plurality of windows 11 arranged in parallel rows and through which light rays freely pass for viewing the X-ray films or radiographs at the windows by means of a light positioned at the rear thereof. The windows may be openings or transparencies in the panel and as illustrated the same are transparencies and are each shaped to provide a rectangular lower portion and a rectangular upper portion joined with the lower portion by upwardly and inwardly directed opposite edge portions 12. The lower rectangular portion is defined by a lower edge 13 and opposite vertically edges 14 while the upper horizontal portion is defined by the top edge 15 and opposite side edges 16. The distance between the opposite side edges 14 of the lower rectangular portion is substantially the same as the distance between the lower edge 12 thereof and the upper edge 15 of the upper rectangular portion. The height of the side edges 14 is substantially the same as the length of the top edge 15.

The panel 10 is cut to provide an arcuate shaped tab 18 and pairs of diagonally disposed narrow slots 19 and 20 at each transparency for receiving an X-ray film or radiograph disposed either horizontally or vertically and which tabs and slots are formed by cutting away a narrow portion of the panel 10. The tabs 18 are disposed slightly below the lower edge 13 of the transparencies respectively and the slots 19 are located one on each side adjacent to and laterally of the diagonally extending edge portions 12 while the slots 20 are disposed parallel with the slots 19 and are located one on each side adjacent to and laterally of the upper rectangular portion.

The tabs 18 are arranged for receiving a portion of the lower edges of the X-ray films or radiographs at the rear thereof and the pairs of slots 19 are provided for receiving opposite corners of the X-ray films or radiographs for mounting the X-ray film or radiograph horizontally at the tansparencies. The pairs of slots 20 are arranged for receiving opposite corners of the X-ray films or radiographs for mounting the same vertically at the transparencies. Thus, any one of the X-ray films or radiographs for any particular tooth or position thereof may be disposed either horizontally or vertically with the bottom edges thereof disposed in alignment whether arranged horizontally or vertically. In Fig. 1 of the drawings, three films or radiographs F are mounted horizontally on the panel while two films or radiographs FF are mounted vertically thereon.

In the form of the invention illustrated in Figs. 5–8 inclusive the mount indicated generally by the reference character 35 includes a panel of any desired size for receiving any number of X-ray films or radiographs of the teeth for any one patient. The panel includes a backing 36 and an overlay or upper ply 37 which is coextensive with the backing and is secured thereto to provide a relatively stiff panel. The backing 36 is formed with a plurality of windows 38 arranged in parallel rows through which light rays freely pass for viewing the X-ray films or radiographs at the windows by means of a light positioned at the rear thereof. The windows may be openings or transparencies in the backing and as illustrated the same are openings and each are shaped to provide a rectangular lower portion and a rectangular upper portion joined with the lower portion by upwardly and inwardly directed opposite edge portions 39 similar in formation to the windows 11 in the previous form of the invention. The upper ply or overlay 37 is provided with openings 40 which are slightly larger than the window openings 38.

In order to retain the X-ray films or radiographs in horizontal or vertical relation at the openings respectively, the overlay or upper ply 37 is provided with tabs 41 which extend upwardly into overlying relation with the backing adjacent the lower edge portions of the window openings 38. The pairs of slots or recesses 42 and 43 are provided between the backing and the overlay which correspond to the pairs of slots 19 and 20 in the previous forms of the invention. The pairs of slots 42 are located one on each side adjacent to and laterally of the diagonally extending edge portions 39 while slots 43 are disposed parallel with the slots 42 and are located one on each side adjacent to and laterally of the upper rectangular portion. The tabs 14 are arranged for receiving a portion of the lower edges of the X-ray films or radiographs between the same and the backing and the pairs of slots 42 are provided for receiving opposite corners of the X-ray films or radiographs for mounting the same horizontally at the window openings 38. The pairs of slots 43 are arranged for receiving opposite corners of the X-ray films or radiographs for mounting the same vertically at the window openings 38. It will be understood that the X-ray films or radiographs are supported upon the edge portions of the backing at the window openings respectively. In Fig. 5 of the drawings, a film or radiograph F is shown mounted horizontally on the panel 35, while a film or radiograph FF is shown mounted vertically thereon.

The mount may also consist of a panel 45 including a backing 46 and an overlay or upper ply 47 as illustrated in Figs. 9 to 12 inclusive of the drawings. The overlay or upper ply 47 is secured to the backing 46 to provide a relatively stiff panel. In this form of the invention the panel 46 is formed with a plurality of windows 48 arranged in parallel rows through which light rays freely pass for viewing the X-ray films or radiographs at the windows by means of a light positioned at the rear thereof. The windows may have openings or transparencies in the backing and as illustrated the same are transparencies and each is adapted to provide a rectangular lower portion and a rectangular upper portion which is joined with the lower portion by upwardly or inwardly directed opposite edge portions 49 similar in formation to the windows 11 and 38 in the previous forms of the invention. The overlay or upper ply 47 is provided with openings 50 which are slightly larger than the transparencies 48.

Figure 9:
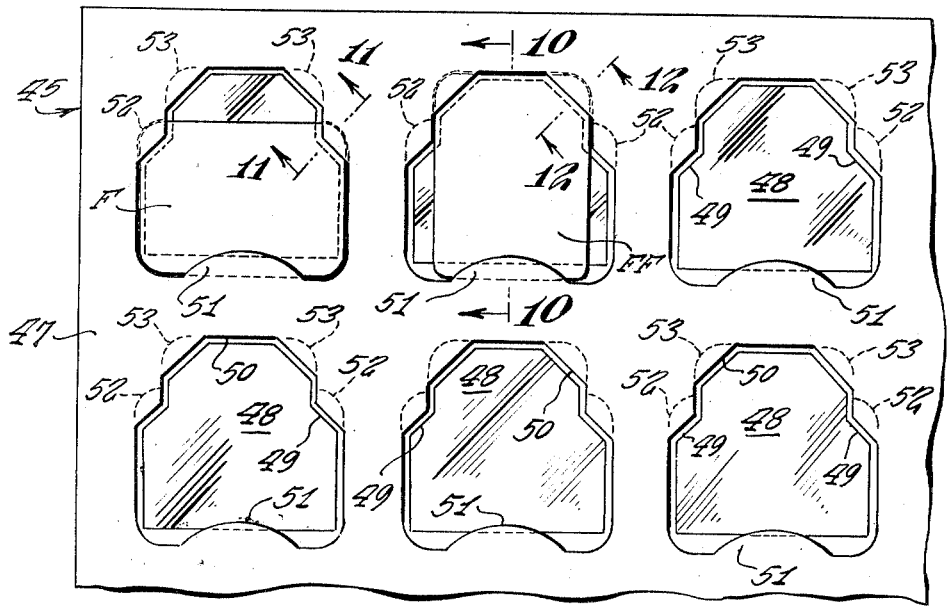
Fig. 9 is a fragmentary plan view of a mount for holding a plurality of X-ray films or radiographs, illustrating still another modified form of the invention.

In order to retain the X-ray films or radiographs in horizontal or vertical relation at the transparencies respectively, the ovelay or upper ply 47 is provided with tabs 51 which extend upwardly into overlying relation with the backing 46. The panel is also provided with pairs of slots 52 and 53 arranged between the overlay or upper ply and the backing. The tabs 51 are disposed slightly below the lower edges of the transparencies respectively and the slots 52 are located one on each side adjacent to and laterally of the diagonally extending edge portions 49, while the slots 53 are disposed parallel with the slots 52 and are located one on each side adjacent to and laterally of the upper rectangular portions of the transparencies respectively. The tabs 51 are arranged for receiving a portion of the lower edges of the X-ray films or radiographs between the same and the backing and the pairs of slots 52 are provided for receiving opposite corners of the X-ray films or radiographs for mounting the same horizontally at the transparencies. The pairs of slots 53 are provided for receiving opposite corners of the X-ray films or radiographs for mounting the same vertically at the transparencies. Thus, any one of the X-ray films or radiographs for any particular tooth may be arranged either horizontally or vertically. As illustrated in Fig. 9 of the drawings, a film or radiograph F is mounted horizontally on the panel 45, while a film or radiograph FF is mounted vertically thereon.

While the invention has been illustrated in the drawings and described in the specification in connection with three forms thereof, it is to be understood that the invention is not so limited and shall cover and include all modifications and forms thereof which fall within the scope thereof.

What is claimed is:

A mount for X-ray films including a panel composed of a backing and an overlay secured to the backing to provide a relatively stiff panel, said backing having a window through which light rays may freely pass, said window including a narrow upper portion, a lower portion of a width substantially the length of the vertical dimension of the window and a truncated portion intermediate said upper and lower portions, said overlay having an opening corresponding generally to the formation of the window, and said backing and overlay being unsecured to provide recesses therebetween laterally of said truncated window portion and laterally of said upper window portion and along one side of said lower window portion for optionally receiving an X-ray film either horizontally or vertically over the window.

References Cited in the file of this patent

UNITED STATES PATENTS

| 864,648 | Jaeger | Aug. 27, 1907 |
| 1,353,846 | Opsahl | Sept. 28, 1920 |
| 1,361,703 | Fennelli | Dec. 7, 1920 |
| 1,410,130 | Sinclair | Mar. 21, 1922 |
| 2,252,632 | Jones | Aug. 12, 1941 |
| 2,439,390 | Jablon | Apr. 13, 1948 |